United States Patent
Kanai

(10) Patent No.: US 8,450,883 B2
(45) Date of Patent: May 28, 2013

(54) MAXIMUM POWER POINT TRACKING CONTROL APPARATUS FOR SOLAR BATTERY

(75) Inventor: Yasushi Kanai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

(21) Appl. No.: 12/760,893

(22) Filed: Apr. 15, 2010

(65) Prior Publication Data

US 2010/0263711 A1    Oct. 21, 2010

(30) Foreign Application Priority Data

Apr. 16, 2009    (JP) ................. 2009-100096

(51) Int. Cl.
*H01H 9/54*    (2006.01)
(52) U.S. Cl.
USPC ............................................. 307/140
(58) Field of Classification Search
USPC ............................................. 307/140
See application file for complete search history.

(56) References Cited

U.S. PATENT DOCUMENTS 5,654,883 A * 8/1997 Takehara et al. ............... 363/79

FOREIGN PATENT DOCUMENTS

| EP | 1457857 | 9/2004 |
|---|---|---|
| JP | 09-056180 | 2/1997 |

* cited by examiner

*Primary Examiner* — Robert L. DeBeradinis
(74) *Attorney, Agent, or Firm* — Rankin, Hill & Clark LLP

(57) ABSTRACT

Maximum power point tracking control apparatus for a solar battery includes: a voltage detection section for detecting an output voltage of the battery; a current detection section for detecting an output current of the battery; a storage section storing therein duty cycle values of a solar-battery output controlling switching element that are predefined on the basis of relationship between output voltages and currents of the battery; and a control section for, at the start of maximum power point tracking control, reading out, from the storage section, one of the duty cycle values that corresponds to the detected output voltage and controlling a duty cycle of the switching element in accordance with the read-out duty cycle value.

3 Claims, 3 Drawing Sheets

MAXIMUM POWER POINT TRACKING CONTROL APPARATUS FOR SOLAR BATTERY

FIELD OF THE INVENTION

The present invention relates to maximum power point tracking control apparatus which supply electric power from a solar battery to a load after performing switching control on the electric power by means of a solar-battery output controlling switching element.

BACKGROUND OF THE INVENTION

Today, propagation of solar batteries is tremendous because of recent severe energy conditions. As well known, the solar battery is a device that converts sunlight energy into electric power. The sunlight energy amount changes every second due to shadows of clouds etc. and rotation of the earth. Therefore, the maximum output power that can be generated the solar battery changes in correspondence with the changing sunlight energy amount reaching the solar battery. Thus, there has been proposed and known maximum power point tracking control (MDPT) for performing control such that the power generatable by a solar battery at a given time point can be output to a load with a maximum output efficiency.

Also known today is a technique for detecting a maximum output power point by means of a so-called "hill climbing" method in order to realize such MPPT control, as disclosed for example in Japanese Patent Application Laid-Open Publication No. HEI-09-56180. The "hill climbing" method comprises increasing or decreasing the output of the solar battery by controlling the duty cycle of a solar-battery output controlling switching element at a given control frequency. Namely, with respect to power of the solar battery output at a time point, the duty cycle of the solar-battery output controlling switching element is increased or decreased by a given variation width in the next or subsequent control period.

More specifically, according to the "hill climbing" method, if the output power of the solar battery has increased in response to increase or decrease of the duty cycle of the solar-battery output controlling switching element, it is determined that the maximum output power point of the solar battery is located in a positive direction as viewed from power of the solar battery detected at a current time point; on the other hand, if the output from the solar battery has decreased in response to increase or decrease of the duty cycle, it is determined that the maximum output power point is located in a negative direction as viewed from power of the solar battery detected at a current time point. In the case where it has been determined that the maximum output power point of the solar battery is located in the positive direction as viewed from the power of the solar battery detected at the current time point, the duty cycle at the current time point is increased by a given value and then the duty cycle is increased or decreased again in the next control period, and then a further determination is made as to whether the power output from the solar battery in response to the thus-increased or decreased duty cycle is in the positive direction or in the negative direction as viewed from the maximum output power point. The aforementioned operations are repeated so as to control the actual power output from the solar battery to approach the maximum output power point.

The output power control method of the solar battery is performed by a power conditioner (i.e., maximum power point tracking control apparatus) increasing or decreasing the duty cycle of a solar-battery output power controlling switching element of a DC-DC converter. At that time, the output power control method constantly controls the duty cycle little by little, for example, by increasing or decreasing the duty cycle in a sine-wave manner while checking how the output power of the solar battery changes in response to increase or decrease of the duty cycle, so that the output power of the solar battery can become maximum. However, if the output power of the solar battery has changed greatly, the aforementioned approach of increasing or decreasing the duty cycle little by little would require a non-negligible, considerable time before the maximum output power point of the solar battery can be found or tracked. This means that a considerable time would be required before the power conditioner outputs the maximum power, generatable by the solar battery at a given time point, to a load; namely, during that time, the power conditioner can not supply the maximum power, generatable by the solar battery, to the load. Therefore, the conventionally-known technique presents the problem that output efficiency of the solar battery, indicative of how much of sunlight energy could be converted into electric power, would unavoidably decrease.

SUMMARY OF THE INVENTION

In view of the foregoing prior art problems, it is an object of the present invention to provide a technique which, in maximum power point tracking control (MPPT) of a solar battery, can reduce a time required for finding or tracking a maximum output power point of the solar battery and thereby enhance output efficiency of the solar battery.

In order to accomplish the above-mentioned object, the present invention provides an improved maximum power point tracking control apparatus for tracking a maximum output power point of a solar battery when supplying electric power, generated by the solar battery, to a load after performing switching control on the electric power by means of a solar-battery output controlling switching element, which comprises: a voltage detection section for detecting an output voltage of the solar battery; a current detection section for detecting an output current of the solar battery; a storage section storing therein duty cycle values of the solar-battery output controlling switching element that are predefined on the basis of relationship between output voltages and output currents of the solar battery; and a control section for, at a start of maximum power point tracking control, reading out, from the storage section, one of the duty cycle values that corresponds to the output voltage detected by the voltage detection section and controlling a duty cycle of the solar-battery output controlling switching element in accordance with the read-out duty cycle value.

In the present invention, the control section reads out, from the storage section, a duty cycle value on the basis of an output voltage of the solar battery detected by the voltage detection section, and controls the duty cycle of the solar-battery output controlling switching element in accordance with the read-out duty cycle value. In this way, the maximum power point tracking control apparatus can start the maximum power point tracking control at a neighborhood of the maximum output power point corresponding to the detected output voltage of the solar battery. As a result, the present invention can reduce the time required before arrival at the maximum output power point and thereby achieve an enhanced output efficiency of the solar battery.

At the start of the maximum power point tracking control, the control section calculates a voltage difference between the output voltage of the solar battery detected by the voltage detection section and an output voltage of the solar battery last detected by the voltage detection section, and, when a voltage-threshold difference between an absolute value of the voltage difference and a predefined voltage threshold value is a positive value, the control section reads out the corresponding duty cycle value from the storage section to control the duty cycle of the solar-battery output controlling switching element in accordance with the read-out duty cycle value.

When the voltage-threshold difference is a positive value, it means that a voltage change from the last detected output voltage is so great that there is a need to reset (set again) the duty cycle. Thus, the control section acquires, from the storage section, a duty cycle value corresponding to the output voltage detected by the voltage detection section. In this way, the maximum power point tracking control can be started at a neighborhood of a maximum output power point represented by the acquired duty cycle value, so that the present invention can reduce the time required before arrival at the maximum output power point and thereby achieve an enhanced output efficiency of the solar battery When the voltage-threshold difference is not a positive value, the control section calculates an output power difference between output power of the solar battery, calculated on the basis of the output voltage detected by the voltage detection section and the output current detected by the current detection section, and output power of the solar battery last calculated by the control section, and the control section further calculates a power-threshold difference between an absolute value of the output voltage difference and a predefined power threshold value. When the power-threshold difference is not a positive value, the control section controls the solar-battery output controlling switching element in accordance with a same duty cycle value as a last duty cycle value that was used to control the duty cycle last time. When the power-threshold difference is a positive value, the control section further determines whether or not the output power difference is a positive value. When the output power difference is a positive value, the control section controls the solar-battery output controlling switching element in accordance with a new duty cycle value calculated by adding together the last duty cycle value and a predetermined duty cycle value change amount. When the output power difference is not a positive value, the control section controls the solar-battery output controlling switching element in accordance with a new duty cycle value calculated by subtracting the duty cycle value change amount from the last duty cycle value.

Namely, based on the "hill climbing" principle that the maximum output power point is located in a positive direction as viewed from the current power if the output from the solar battery has increased in response to increase or decrease of the duty cycle value while the maximum output power point is located in a negative direction as viewed from the current power if the output from the solar battery has decreased in response to increase or decrease of the duty cycle value, the control section starts the maximum power point tracking control at a neighborhood of the maximum output power point corresponding to the output voltage of the solar battery detected by the voltage detection section. For example, if it has been determined that the maximum output power point is located in the positive direction as viewed from power detected in a given control period, the control section increases the duty cycle from the current value by a given value and then again increases or decreases the duty cycle, and then it determines whether power output in response to the increased or decreased duty cycle value is located in the positive direction or in the negative direction as viewed from the maximum output power point. The control section controls the actual power output from the solar battery to approach the maximum output power point by repeating the aforementioned operations. In this way, the maximum power point tracking control can be started at a neighborhood of the maximum output power point corresponding to the output voltage of the solar battery detected by the voltage detection section, to thereby find a maximum output power point based on the "hill climbing" method. As a result, the present invention can reduce the time required before arrival at the maximum output power point and thereby achieve an enhanced output efficiency.

The predetermined duty cycle value change amount is calculated by multiplying the output power difference by a constant that is determined on the basis of the output power difference and the output power of the solar battery. Specifically, the constant is acquired by the control section referencing the storage section on the basis of the output power difference and the output power. In this way, the duty cycle value change amount can be made variable, so that the present invention can perform the maximum power point tracking control with an enhanced flexibility corresponding to the type of the solar battery and scale or size of the power generating facility.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
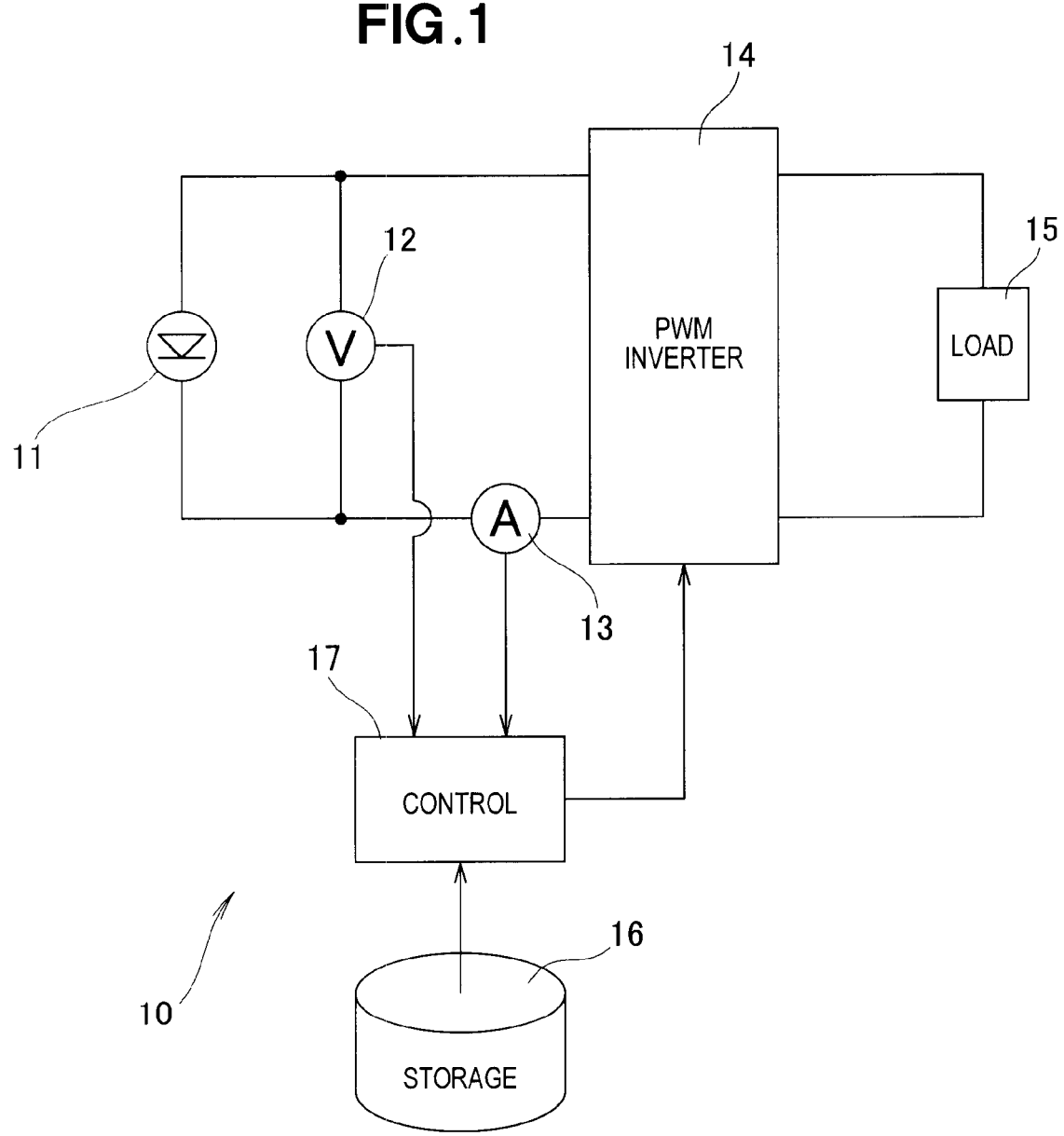
FIG. 1 is a block diagram showing an example general setup of an embodiment of a maximum power point tracking control apparatus of the present invention for use with a power generating facility employing a solar battery.
Figure 2:
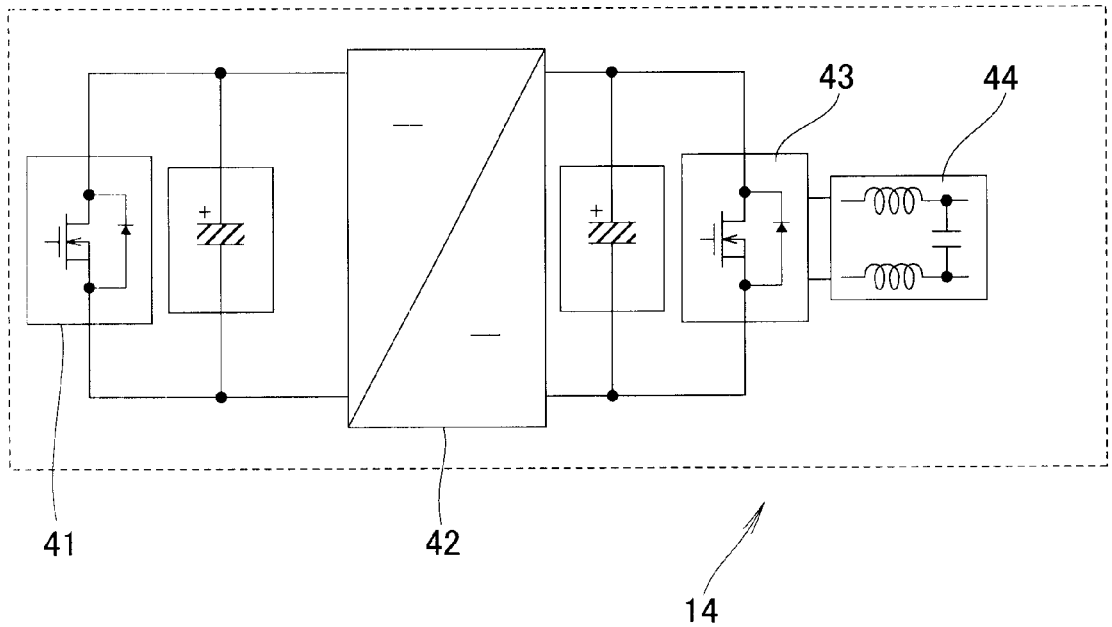
FIG. 2 is a diagram showing a construction of a PWM inverter shown in FIG. 1.

FIG. 1 is a block diagram showing an example general setup of an embodiment of a maximum power point tracking control apparatus 10 of the present invention for use with a power generating facility employing a solar battery 11, and FIG. 2 shows a construction of a PWM inverter 14 shown in FIG. 1.

As shown in FIG. 1, the maximum power point tracking control apparatus 10 includes a voltage detection section 12, a current detection section 13, the PWM (Pulse Width Modulation) inverter 14, a storage section 16, and a control section 17.

In FIG. 1, electric power output from the solar battery 11 is supplied to a load 15 via the PWM inverter 14. As shown in FIG. 2, the PWM inverter 14 includes a rectifier 41, a DC-DC converter 42, an FET bridge 43 and an LC filter 44.

The rectifier 41 converts an A.C. voltage output from the solar battery 11 into a D.C. voltage and outputs the D.C. voltage to the DC-DC converter 42. The DC-DC converter 42 boosts the D.C. voltage output from the rectifier 41 and outputs the boosted D.C. voltage to the FET bridge 43. The FET bridge 43 is a switching element that converts the D.C. voltage into a rectangular-wave voltage through pulse width modulation and outputs the rectangular-wave voltage to the LC filter 44. In the instant embodiment, the FET bridge 43 functions as a solar-battery output controlling switching element. The LC filter 44 converts the rectangular-wave voltage, output from the FET bridge 43, into a sine-wave voltage and supplies the sine-wave voltage to the load 15.

The output voltage from the solar battery 11 is detected by the voltage detection section 12 connected in parallel with the solar battery 11 while an output current from the solar battery 11 is detected by the current detection section 13 connected in series with the solar battery 11, and the thus-detected output voltage and current are both supplied to the control section 17.

Figure 3:
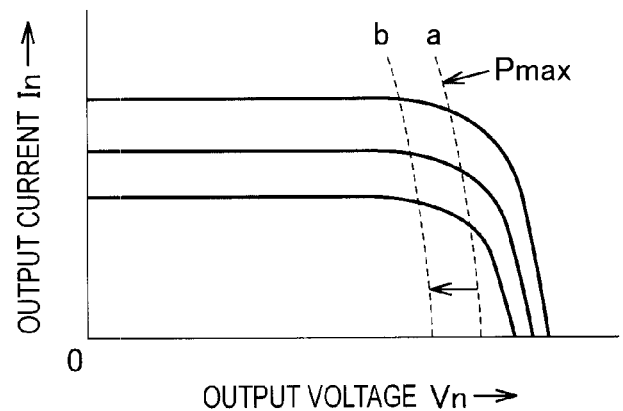
FIG. 3 is a diagram showing an example current-voltage characteristic of the solar battery shown in FIG. 1.

FIG. 3 is a graph showing a voltage vs. current characteristic of the solar battery 11, where are shown three examples of voltage vs. current characteristic curves differing according to temperature and degree of aging over time, and where the vertical axis represents output currents In of the solar battery 11 while the horizontal axis represents output voltages Vn of the solar battery 11. Output power Pn of the solar battery 11 can be calculated by multiplying an output current In and an output voltage Vn, using the voltage vs. current characteristic curves of FIG. 3. It is known that the maximum output power point Pmax of the output power Pn varies according to the temperature and degree of aging over time of the solar battery 11. More specifically, FIG. 3 shows a manner in which, as the aging or aged degradation of the solar battery 11 progresses and/or the temperature increases, the maximum output power point Pmax lowers from a high-power position where degradation of the solar battery 11 is little and the temperature is relatively low (e.g., position indicated by broken line a) to a lower-power position (e.g., position indicated by broken line b) in a direction of a leftward arrow.

Figure 4:
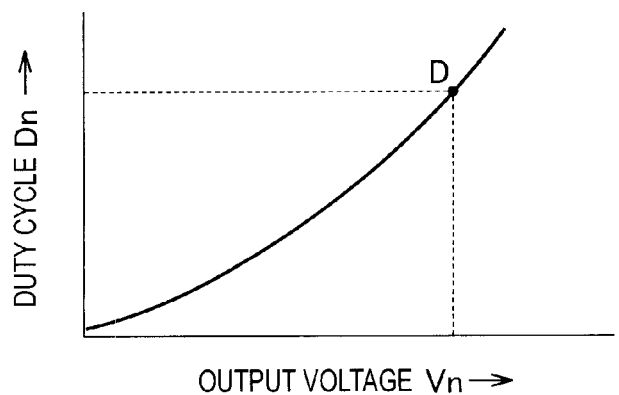
FIG. 4 is a diagram showing an example data structure of a duty cycle map stored in a storage section shown in FIG. 1.

The maximum power point tracking control apparatus 10 is constructed with the aforementioned temperature changes and aging taken into consideration. Namely, possible values of the duty cycle (hereinafter referred to as "duty cycle values") of the FET bridge 43 of the PWM inverter 14 are checked in advance, and data indicative of relationship between possible output voltages and duty cycle values (hereinafter, such data will be referred to as "duty cycle map") as shown in FIG. 4 are created and stored in the storage section 16 in advance. In FIG. 4, the vertical axis represents duty cycle values Dn while the horizontal axis represents output voltages Vn of the solar battery 11. When the output voltage detected by the voltage detection section 12 is Vn, the duty cycle value Dn corresponding to the detected output voltage Vn is D.

The control section 17 reads out, from the storage section 16, one of the duty cycle values that corresponds to an output voltage V of the solar battery 11 detected by the voltage detection section 12. Then, the control section 17 performs maximum power point tracking control of the solar battery 11 by controlling the duty cycle of the PWM inverter 14 (FET bridge 43) that is the solar-battery output controlling switching element, as will be later detailed.

Figure 5:
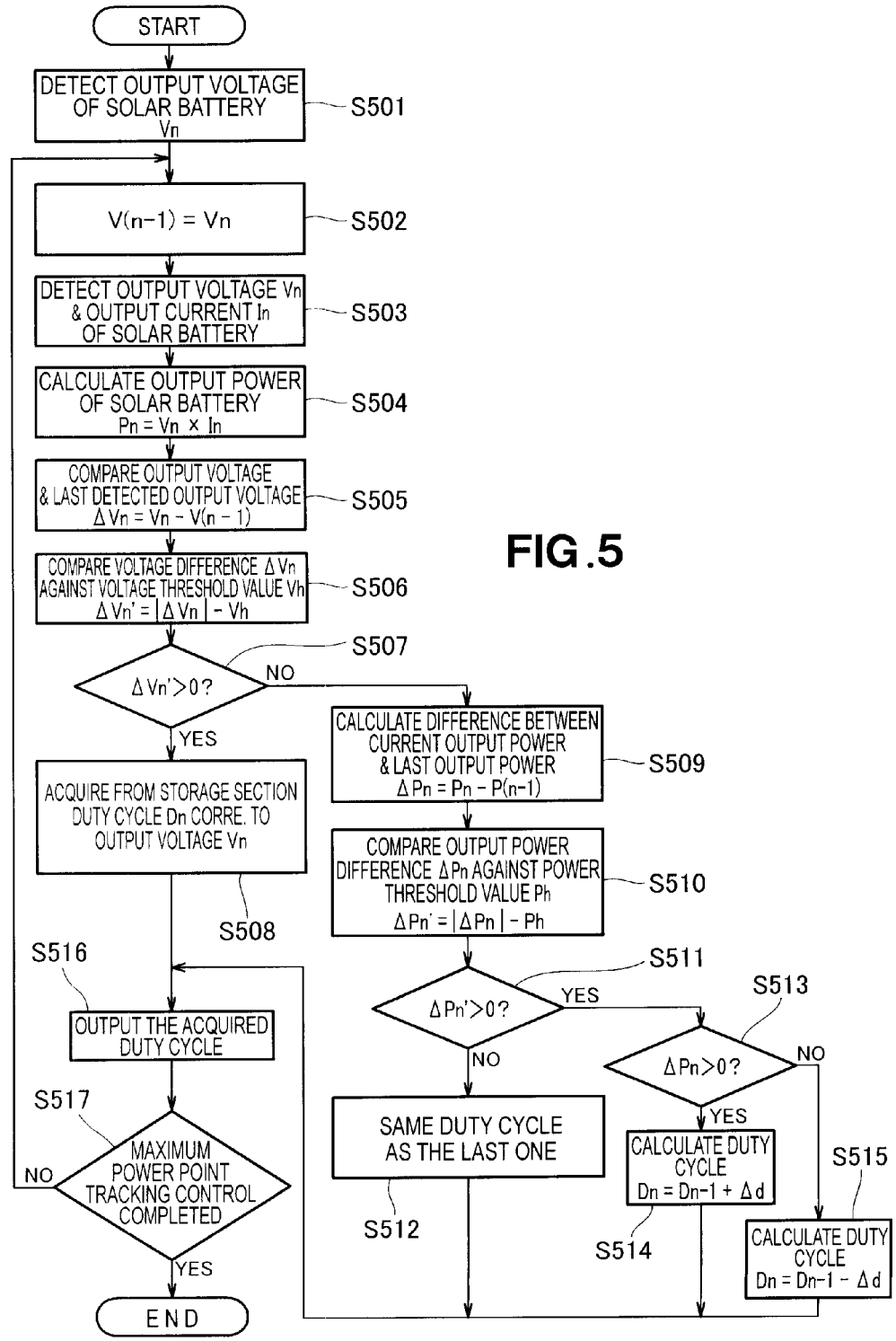
FIG. 5 is a flow chart showing behavior of the embodiment of the maximum power point tracking control apparatus.

FIG. 5 is a flow chart showing behavior of the maximum power point tracking control apparatus 10, and more specifically an example operational sequence performed by the control section 17 shown in FIG. 1.

With reference to the flow chart of FIG. 5, the following describe the behavior of the embodiment of the maximum power point tracking control apparatus 10 (more specifically, behavior of the control section 17) for the power generating facility employing the solar battery shown in FIG. 1.

In starting the maximum power point tracking control of the solar battery 11, the control section 17 first detects an output voltage Vn of the solar battery at step S501 and holds the detected output voltage as V(n-1) in a predetermined region of the storage section 16 at step S502.

Then, the control section 17 takes in, at a predetermined sampling interval from the last output voltage detection, an output voltage Vn of the solar battery 11 detected by the voltage detection section 12 and an output current In detected by the current detection section 13, at step S503. Then, the control section 17 calculates an output power Pn of the solar battery 11 on the basis of the output voltage Vn and output current In using arithmetic expression (1) below, at step S504.

$$Pn = Vn \times In \quad (1)$$

After that, the control section 17 compares the output voltage Vn currently detected by the voltage detection section 12 and the output voltage V(n-1) last detected by the voltage detection section 12 and thereby calculates a voltage difference ΔVn using arithmetic expression (2) below, at step S505.

$$\Delta Vn = Vn - V(n-1) \quad (2)$$

Then, the control section 17 compares the voltage difference ΔVn, calculated at step S505, against a predefined voltage threshold value Vh and thereby calculates a voltage-threshold differenceΔVn') using arithmetic expression (3) below, at step S506.

$$\Delta Vn' = |\Delta Vn| - Vh \quad (3)$$

Note that the above-mentioned predefined voltage threshold value Vh is a voltage value within a range that permits tracking of the maximum power point of the solar battery 11 by achieving only a limited small power change of the solar battery 11 and preventing efficiency decrease of the solar battery 11 without a need to search through the duty cycle map prestored in the storage section 16.

At next step S507, the control section 17 determines whether or not the voltage-threshold differenceΔVn' calculated at step S506 is a positive value. If the voltage-threshold differenceΔVn' is a positive value (ΔVn'>0) (i.e. YES determination at step S507), it means that the voltage change from the last detected output voltage is so great that there is a need to reset (set again) the duty cycle Dn. Thus, the control section 17 searches through the duty cycle map, stored in the storage section 16, to acquire a duty cycle value Dn corresponding to the output voltage Vn detected by the voltage detection section 12, at step S508. Then, at step S516, the control section 17 outputs to the PWM inverter 14 the acquired duty cycle value Dn as an initial duty cycle value, to thereby perform switching control on the output of the solar battery 11 via the FET bridge 43 in accordance with the acquired duty cycle value Dn.

If the voltage-threshold differenceΔVn' is equal to or smaller than zero (ΔVn'≦0) (i.e. NO determination at step S507), it means that the voltage change is small and there is no need to perform the switching control based on a duty cycle value acquired by searching through the duty cycle map, and thus, the control section 17 calculates a difference ΔPn between the current output power Pn of the solar battery 11 and the last output power P(n-1) of the solar battery 11 (i.e., output power difference ΔPn) using arithmetic expression (4) below, at step S509.

$$\Delta Pn = Pn - P(n-1) \quad (4)$$

Then, the control section 17 compares the absolute value of the output power difference ΔPn, calculated at step S509, against a predefined power threshold value Ph and thereby calculates a differenceΔPn' from the power threshold value Ph (hereinafter referred to as "power-threshold difference ΔPn'") using arithmetic expression (5) below, at step S510.

$$\Delta Pn' = |\Delta Pn| - Ph \quad (5)$$

Note that the predefined power threshold value Ph is a power value within a range that would achieve only a limited small power change amount and would not contribute to efficiency improvement even when the duty cycle value is changed.

After that, the control section 17 determines, at step S511, whether or not the power-threshold differenceΔPn' calculated at step S510 is a positive value. If the power-threshold differenceΔPn' is equal to or smaller than zero (ΔPn'≦0), i.e. the power-threshold differenceΔPn' is not a positive value (NO determination at step S511), it means the current calculated output power Pn presents little change (or has changed little) from the last calculated output power P(n-1), i.e. the current calculated output power Pn is within the range of the predetermined power threshold value, and thus, the control section 17 outputs to the PWM inverter 14 the same duty cycle value Dn as the last output initial duty cycle value Dn (step S512).

If the power-threshold differenceΔPn' is a positive value (ΔPn'>0), i.e. with a YES determination at step S511, the control section 17 further determines, at step S513, whether the power difference ΔPn calculated using arithmetic expression (4) above is a positive value. If the power difference ΔPn is a positive value (ΔPn>0) (i.e., YES determination at step S513), it means that the current calculated power Pn is greater than (i.e., has increased from) the last calculated power P(n-1), and that the maximum power point is in an increasing (or upward) trend. Therefore, the control section 17 calculates a new duty cycle Dn using arithmetic expression (6) below at step S514.

$$Dn = Dn-1 + \Delta d \quad (6)$$

In arithmetic expression (6) above, Δd indicates a duty cycle value change amount, and let it be assumed that the duty cycle value change amount Δd is calculated by multiplying the output power difference ΔPn by a constant k, using arithmetic expression (7) below, in such a manner that it can be increased or decreased in accordance with the current output power Pn and output power difference ΔPn. The constant k is a value determined depending on relationship between the output power difference ΔPn and the output power Pn, and it is assumed here that various values of the constant k are prestored in the predetermined region of the storage section 16 along with the duty cycle map.

$$\Delta d = k \times \Delta Pn \quad (7)$$

Further, if the power difference ΔPn is not a positive value (ΔPn≦0) (i.e., NO determination at step S513), it means that the current calculated output power Pn is smaller than (i.e., has decreased from) the last calculated output power P(n-1), and that the maximum power point is smaller than the current value. Thus, the control section 17 calculates a new duty cycle value Dn using arithmetic expression (8) below at step S515.

$$Dn = Dn-1 - \Delta d \quad (8)$$

As in the case whereΔPn>0 (i.e., as in arithmetic expression (6) above), the duty cycle value change amount Δd used in arithmetic expression (8) is calculated by multiplying the output power difference ΔPn by a constant k.

Then, at step S516, the control section 17 outputs the new duty cycle value Dn, calculated in the aforementioned manner, to the FET bridge (switching element) 43 of the PWM inverter 14 that controls the output of the solar battery 11.

The aforementioned operations at and after step S502 are performed repetitively until the maximum power point tracking control of the solar battery 11 is completed (i.e., YES determination is made at step S517), namely, until the output power Pn of the solar battery 11 reaches the maximum output power point Pmax. During that time, the FET bridge 43 of the PWM inverter 14 keeps supplying power output from the solar battery 11 to the load 15 after performing switching control on the output power on the basis of each duty cycle value Dn output from the control section 17.

Note that the current-voltage characteristic of the solar battery 11 shown in FIG. 3 differs depending on the type of the solar battery 11 used and the output voltage Vn also differs depending on the number of series connections of the solar battery 11. Therefore, in the case where any desired type of the solar battery 11 is selectable from among a plurality of types, the maximum power point tracking control apparatus 10 is constructed to permit selection from among a plurality of different duty cycle maps, prepared in advance, so as to appropriately deal with the characteristic of each of the types of the solar battery 11. Similarly, in the case where any desired number of the series connections of the solar battery 11 is selectable, the maximum power point tracking control apparatus 10 is constructed to permit selection from among a plurality of different duty cycle maps, prepared in advance, so as to appropriately deal with the characteristic of the solar battery 11 having the desired number of the series connections. In this way, it is possible to provide a more sophisticated maximum power point tracking control apparatus 10 having an increased flexibility and extensibility. In such a case, an arrangement has to be made such that any desired one of the duty cycle maps can be selected in a hardware or software manner via not-shown selection switches.

The foregoing description about the embodiment of the maximum power point tracking control apparatus 10 of the present invention may be summarized as follows. The control section 17 reads out, from the storage section 16, a duty cycle value on the basis of an output voltage of the solar battery 11 detected by the voltage detection section 12, and controls the duty cycle of the solar-battery output controlling switching element (i.e., FET bridge 43 the PWM inverter 14) in accordance with the read-out duty cycle value. In this way, the maximum power point tracking control apparatus 10 can start the maximum power point tracking control at a neighborhood of the maximum output power point corresponding to the detected output voltage of the solar battery 11. As a result, the maximum power point tracking control apparatus 10 of the present invention can reduce the time required before arrival at the maximum output power point and thereby achieve an enhanced output efficiency of the solar battery 11.

Further, based on the "hill climbing" principle that the maximum output power point is located in a positive direction as viewed from the current power if the output from the solar battery 11 has increased in response to increase or decrease of the duty cycle value while the maximum output power point is located in a negative direction as viewed from the current power if the output from the solar battery 11 has decreased in response to increase or decrease of the duty cycle value, the control section 17 starts the maximum power point tracking control at a neighborhood of the maximum output power point corresponding to the output voltage of the solar battery 11 detected by the voltage detection section 12. For example, if it has been determined that the maximum output power point is located in the positive direction as viewed from power detected in a given control period, the control section 17 increases the duty cycle from the current value by a given value and then again increases or decreases the duty cycle in the next control period, and then it determines whether power output in response to the increased or decreased duty cycle value is located in the positive direction or in the negative direction as viewed from the maximum output power point. The control section 17 controls the actual power output from the solar battery 11 to approach the maximum output power point by repeating the aforementioned operations. In this way, the control section 17 can start the maximum power point tracking control at a neighborhood of the maximum output power point corresponding to the output voltage of the solar battery 11 detected by the voltage detection section 12, to thereby find or track a maximum output power point based on the "hill climbing" method. As a result, the control section 17 of the maximum power point tracking control apparatus 10 of the present invention can reduce the time required before arrival at the maximum output power point and thereby achieve an enhanced output efficiency.

Further, the control section 17 acquires the proportional constant k by referencing the storage section 16 in accordance with the output power difference ΔPn and output power Pn and then multiplies the output power difference ΔPn by the proportional constant k, to thereby calculate a duty cycle value change amount Δd. In this way, the duty cycle value change amount Δd can be made variable, so that the maximum power point tracking control apparatus 10 can perform the maximum power point tracking control with an enhanced flexibility and extensibility for any type of the solar battery 11 and any scale or size of the power generating facility.

What is claimed is:

1. A maximum power point tracking control apparatus for tracking a maximum output power point of a solar battery when supplying electric power, generated by the solar battery, to a load after performing switching control on the electric power by means of a solar-battery output controlling switching element, the maximum power point tracking control apparatus comprising:
a voltage detection section for detecting an output voltage of the solar battery;
a current detection section for detecting an output current of the solar battery;
a storage section storing therein duty cycle values of the solar-battery output controlling switching element that are predefined on the basis of relationship between output voltages and output currents of the solar battery; and
a control section for, at a start of maximum power point tracking control, reading out, from the storage section, one of the duty cycle values that corresponds to the output voltage detected by the voltage detection section and controlling a duty cycle of the solar-battery output controlling switching element in accordance with the read-out duty cycle value;
wherein, at the start of the maximum power point tracking control, the control section calculates a voltage difference between the output voltage of the solar battery detected by the voltage detection section and an output voltage of the solar battery last detected by the voltage detection section, and, when a voltage-threshold difference between an absolute value of the voltage difference and a predefined voltage threshold value is a positive value, the control section reads out the corresponding duty cycle value from the storage section to control the duty cycle of the solar-battery output controlling switching element in accordance with the read-out duty cycle value.

2. The maximum power point tracking control apparatus according to claim 1, wherein
a) when the voltage-threshold difference is not a positive value, the control section calculates an output power difference between output power of the solar battery, calculated on the basis of the output voltage detected by the voltage detection section and the output current detected by the current detection section, and output power of the solar battery last calculated by the control section, and the control section further calculates a power-threshold difference between an absolute value of the output voltage difference and a predefined power threshold value,
b) when the power-threshold difference is not a positive value, the control section controls the solar-battery output controlling switching element in accordance with a same duty cycle value as a last duty cycle value that was used to control the duty cycle last time,
c) when the power-threshold difference is a positive value, the control section further determines whether or not the output power difference is a positive value,
d) when the output power difference is a positive value, the control section controls the solar-battery output controlling switching element in accordance with a new duty cycle value calculated by adding together the last duty cycle value and a predetermined duty cycle value change amount, and
e) when the output power difference is not a positive value, the control section controls the solar-battery output controlling switching element in accordance with a new duty cycle value calculated by subtracting the duty cycle value change amount from the last duty cycle value.

3. The maximum power point tracking control apparatus of claim 2, wherein the predetermined duty cycle value change amount is calculated by multiplying the output power difference by a constant that is determined on the basis of the output power difference and the output power of the solar battery.

* * * * *